US010194016B1

United States Patent
Lapic et al.

(10) Patent No.: US 10,194,016 B1
(45) Date of Patent: Jan. 29, 2019

(54) ACTIVATION OF SMS SIGNALING FROM DYNAMICALLY ACTIVATED CONTROL INTERFACE

(71) Applicant: Zipwhip, Inc., Seattle, WA (US)

(72) Inventors: James Lapic, Kirkland, WA (US); Alan Capps, Monroe, WA (US); Michael Bradley, Seattle, WA (US)

(73) Assignee: Zipwhip, Inc., Seattle, WA (US)

(*) Notice: Subject to any disclaimer, the term of this patent is extended or adjusted under 35 U.S.C. 154(b) by 0 days.

(21) Appl. No.: 15/880,915

(22) Filed: Jan. 26, 2018

(51) Int. Cl.
*H04M 1/72* (2006.01)
*H04M 1/725* (2006.01)
*H04L 12/58* (2006.01)

(52) U.S. Cl.
CPC ... *H04M 1/72552* (2013.01); *H04M 1/72561* (2013.01); *H04M 1/72569* (2013.01); *H04M 1/72597* (2013.01); *H04L 51/16* (2013.01)

(58) Field of Classification Search
CPC ...... H04M 7/0015; H04L 51/32; H04L 51/36; H04L 51/24; H04L 51/00; H04L 51/14; H04W 4/02; H04W 4/14; H04W 4/08; H04W 4/90
See application file for complete search history.

(56) References Cited

U.S. PATENT DOCUMENTS

| 8,843,853 | B1* | 9/2014 | Smoak | G06F 3/0482 715/839 |
| 2005/0038876 | A1* | 2/2005 | Chaudhuri | G06F 17/3087 709/219 |
| 2012/0089669 | A1* | 4/2012 | Berg | H04J 3/0667 709/203 |
| 2013/0139148 | A1* | 5/2013 | Berg | H04J 3/0667 717/177 |
| 2016/0285794 | A1* | 9/2016 | Naidu | H04L 51/14 |
| 2018/0032933 | A1* | 2/2018 | Guthridge | G06Q 10/06313 |

* cited by examiner

*Primary Examiner* — Diane Mizrahi
(74) *Attorney, Agent, or Firm* — FSP LLC

(57) ABSTRACT

A system and method dynamically generates structured graphical user interfaces based on the type of device accessing a user interface. The system and method dynamically trigger the pre-population of content within a native application or internet-based application on user agent information and user-entered information and initiates SMS communications between users of disparate device types.

14 Claims, 8 Drawing Sheets

ACTIVATION OF SMS SIGNALING FROM DYNAMICALLY ACTIVATED CONTROL INTERFACE

BACKGROUND

Traditional person-to-person text messaging channels do not support high-traffic throughput, and do not facilitate high-quality, high-integrity business communications. Spam and unconsented messaging are considerable problems which can further reduce the efficiency of traditional channels by further constricting already limited throughput. Traditional networks and their users are unprotected from this type of messaging abuse, in part because bad actors are not limited in how they interact with these networks. Further, traditional systems lack the ability to evaluate this type of threat on an ongoing, real-time basis.

Current inefficiencies associated with administrating SMS messaging further restrict the ability of users to fully employ SMS messaging in business-to-business B2B and business-to-client B2C paradigms. This is due in part to traditional channels not providing an efficient means of integration with third-party services as well as the difficulties of utilizing SMS communications across disparate devices. This limits the ability of users to integrate, track, and analyze this increasingly vital form of communication.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
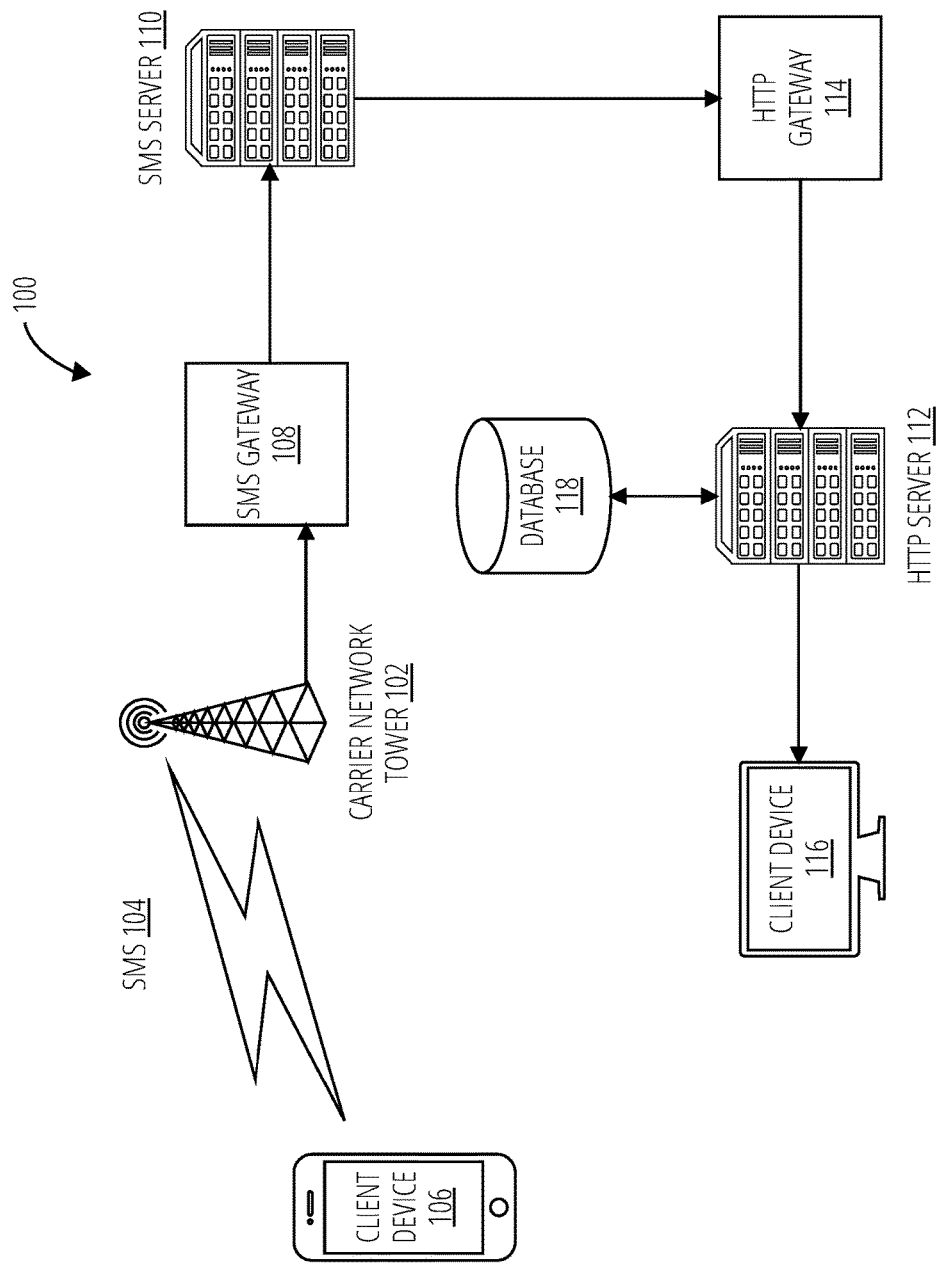
FIG. 1 illustrates an embodiment of a messaging service environment 100.

A business may wish to utilize text messaging to interact with customers and require a means to integrate this messaging easily with the customer's Internet experience and the business' sales and customer service pipeline. The business may interact with a user interface, inputting a reply number and a contact message to configure a user interface (UI) generator to generate a user interface. The reply number may be a text-enabled number which may be linked to a mobile device or may be linked to a non-mobile number which is provisioned for SMS communication. The UI generator may generate a first structured graphical user interface (GUI). The first structured GUI may be provided to the business user, preconfigured to route contact requests to the business user by generating or triggering the appropriate response depending on a customer's experience. The first structured GUI may be automatically generated and linked on a business user's website or mobile app, or may be provided in markup, for example HTML or XML.

The first structured GUI may also be implemented as machine logic, for example, Javascript, which the user may then integrate manually into their website or application as a non-transitory machine logic configuration for operating a computer processor. This first user interface when instantiated by the processor may comprise, for example a link or button, and a text interface. The button or other visual trigger may communicate to the customer the need to perform a triggering action, and may be operable for that purpose. The first structured GUI may also provide instructions and the functionality to allow the customer to add or modify a message to the business. A customer may navigate to the first user interface with the auto-generated button on it. The user then clicks on the button and the format selector, selecting the correct format for the user's experience based on whether that user is using a mobile device or a non-mobile device.

The format selector may use, for example, user agent information to identify the device being used. If the user is using a mobile device, the format selector may select a native app trigger to send to the mobile device to trigger the device to load its native messaging application. The native messaging application may then be populated with the contact message, which may then be sent by the user through their carrier's SMS server. In the event that the user is utilizing a non-mobile device, the format selector may configure the UI generator with the response format to generate a second structured GUI. The second structured GUI may then be pre-populated with the contact number and the contact message. Because the non-mobile device is likely not connected to a mobile carrier network, the message may then be sent to a server over a standard internet connection, for example, Ethernet. Once the message reaches the server, the message may then be transferred to a SMS number and transmitted to the reply number via a separate "temporary" number. The temporary number may be an account or telephone number which has been provisioned to transmit internet to SMS traffic. The reply number may be routed back to a SMS provisioned non-mobile device or a mobile device. The business account may then be utilized to interact with the customer via this connection.

The business account may receive replies on a third structured GUI which may further allow the business to track and integrate communications with the business' customer flow. A UI generator is configured with a reply number and a contact message to generate a first structured GUI, and a contact request is received on the first structured GUI. The contact request is parsed into user agent information, a user message, and a user number with a request analyzer. A format selector is operated with the user agent information to select a response format. The response format may be a native app trigger if the user agent information indicates a mobile device. The response format may configure the UI generator to generate a second structured GUI if the user agent information indicates a non-mobile browser. A response is pre-populated with the user number and the contact message, and transmitted with the response to the reply number via a SMS server.

FIG. 1 illustrates an embodiment of a messaging service environment 100. The messaging service environment 100 comprises a carrier network tower 102, a SMS 104, a client device 106, an SMS gateway 108, a SMS server 110, an HTTP server 112, an HTTP gateway 114, a client device 116, and a database 118. The client device 106 transmits the SMS 104 to the carrier network tower 102, the SMS server 110 receives the SMS 104 from the carrier network tower 102 via the SMS gateway 108 the HTTP server 112 receives the SMS 104 via the HTTP gateway 114 and transmits the SMS 104 to the client device 116 and the database 118.

Figure 2:
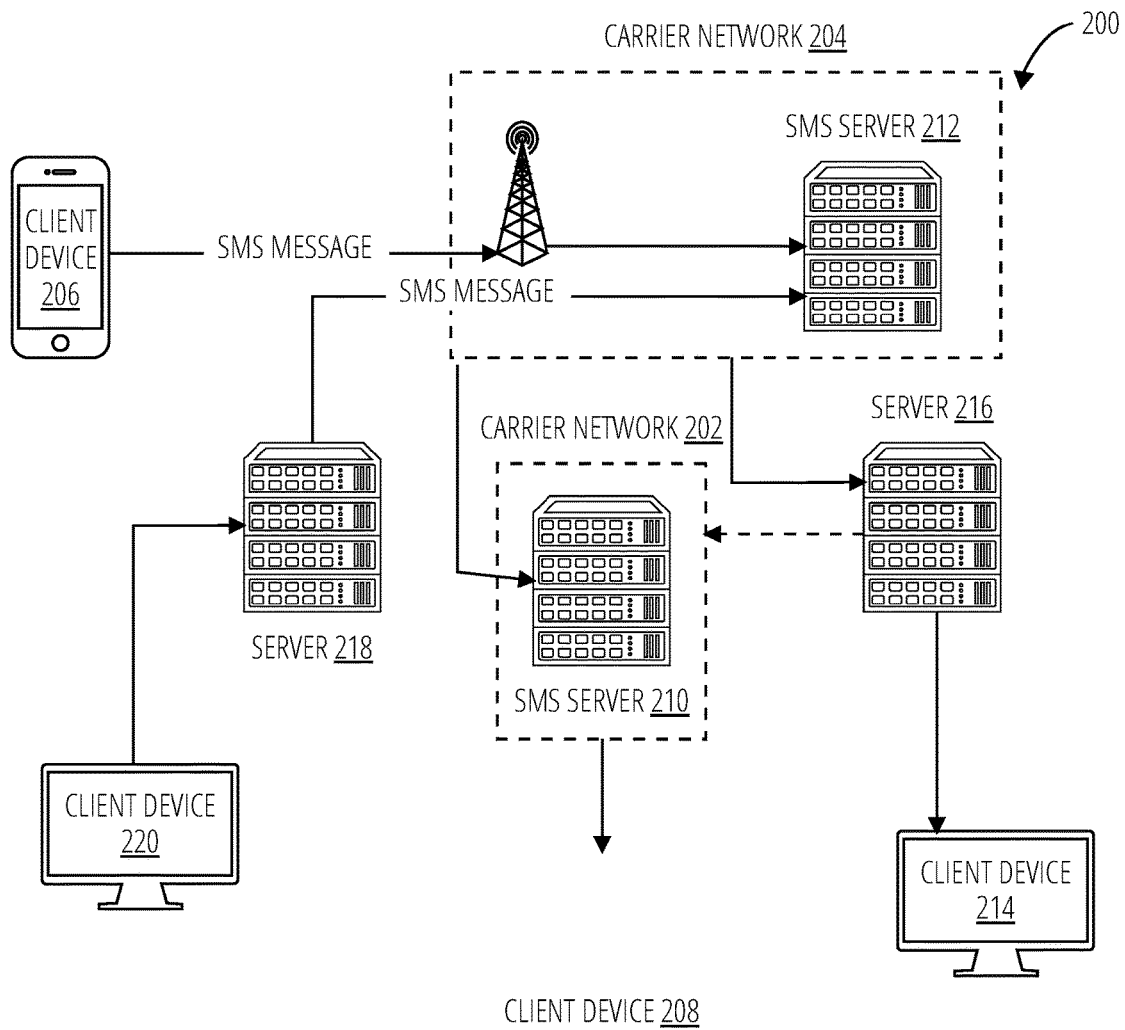
FIG. 2 illustrates an embodiment of a messaging service environment 200.

FIG. 2 illustrates a messaging service environment 200 in accordance with one embodiment. The messaging service environment 200 comprises a carrier network 202, a carrier network 204, a client device 206, a client device 208, a SMS server 210, a SMS server 212, a client device 214, a server 216, and a client device 220. The client device 206 transmits a SMS message to the SMS server 212 via the carrier network 204. The SMS server 212 transmits the SMS message to the server 216, and the server 216 transmits the SMS message to the client device 214. The client device 220 transmits a SMS message to the server 218 and the server 218 transmits the SMS message to the SMS server 212 via the carrier network 204. The SMS server 212 transmits the SMS message to the SMS server 210 via the carrier network 202. The SMS server 210 transmits the SMS message to the client device 208

Figure 3:
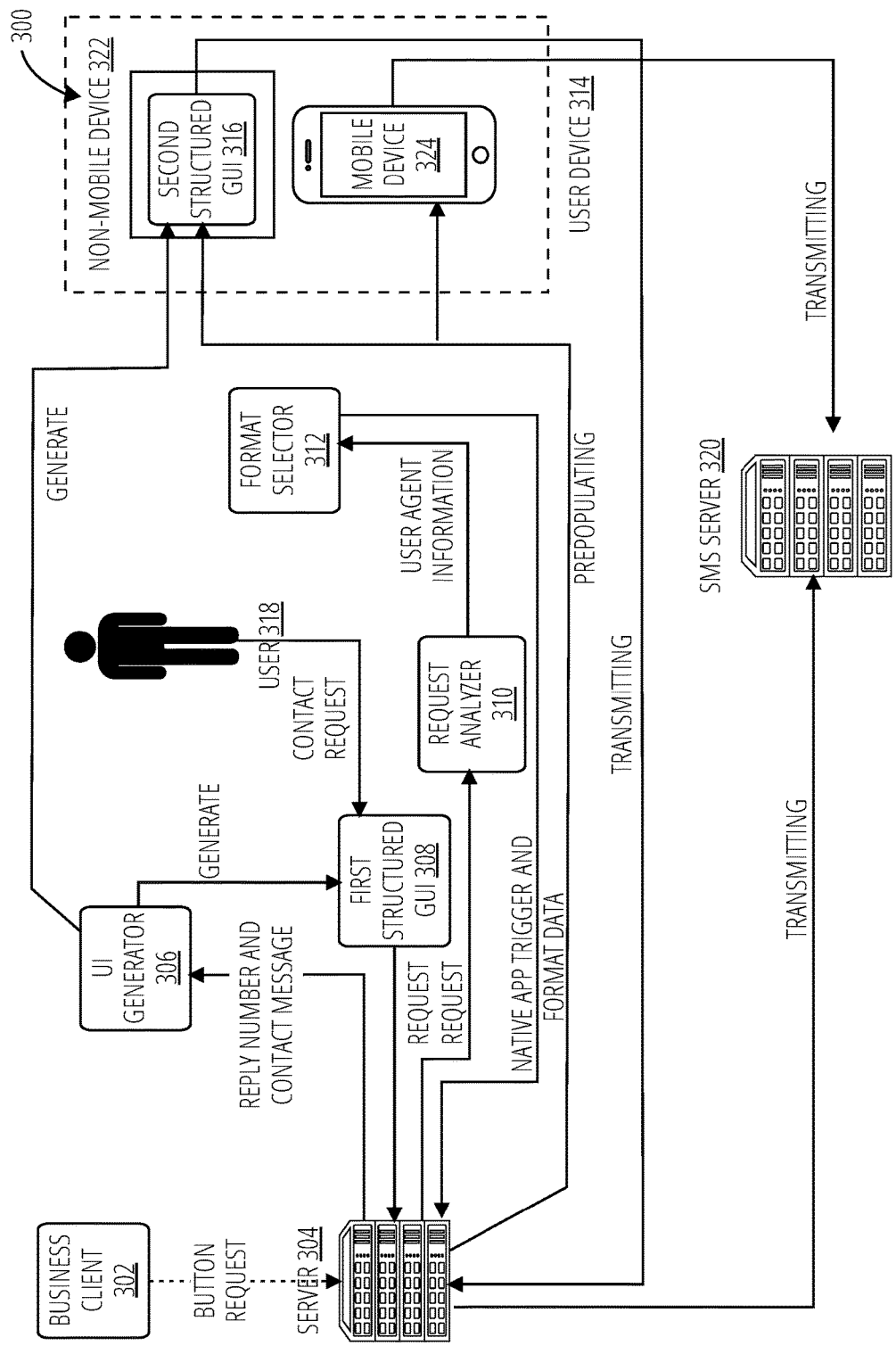
FIG. 3 illustrates an embodiment of a messaging service system 300.

FIG. 3 illustrates an embodiment of a messaging service 300. The messaging service 300 comprises a business client 302, a server 304, a UI generator 306, a first structured GUI 308, a request analyzer 310, a format selector 312, a user device 314, a second structured GUI 316, a user 318, a SMS server 320, a non-mobile device 322, and a mobile device 324.

The business client 302 transmits a button request to the server 304, the server 304 parses the button request into request information and a client identification. The UI generator 306 generates a structured GUI on the business client 302.

The server 304 receives a request from a first structured GUI 308. The request analyzer 310 analyzes the request and operates a format selector with the user agent information to select a response format.

The format selector 312 transmits the native app trigger and format data to the server 304 to generate the second structured GUI 316 if the user agent information indicates a non-mobile device browser, or triggers a native messaging app if the user agent information indicates a mobile device.

The server 304 pre-populates a response with the user number and contact message on the native messaging app on the mobile device 324 and in the user device 314, transmits the response to the reply number via the SMS server 320.

The server 304 pre-populates a response with the user number and contact message on the second structured GUI 316 on the non-mobile device 322 and transmits the response to the server 304, the server 304 transmitting the contact message to the reply number via the SMS server 320.

Figure 4:
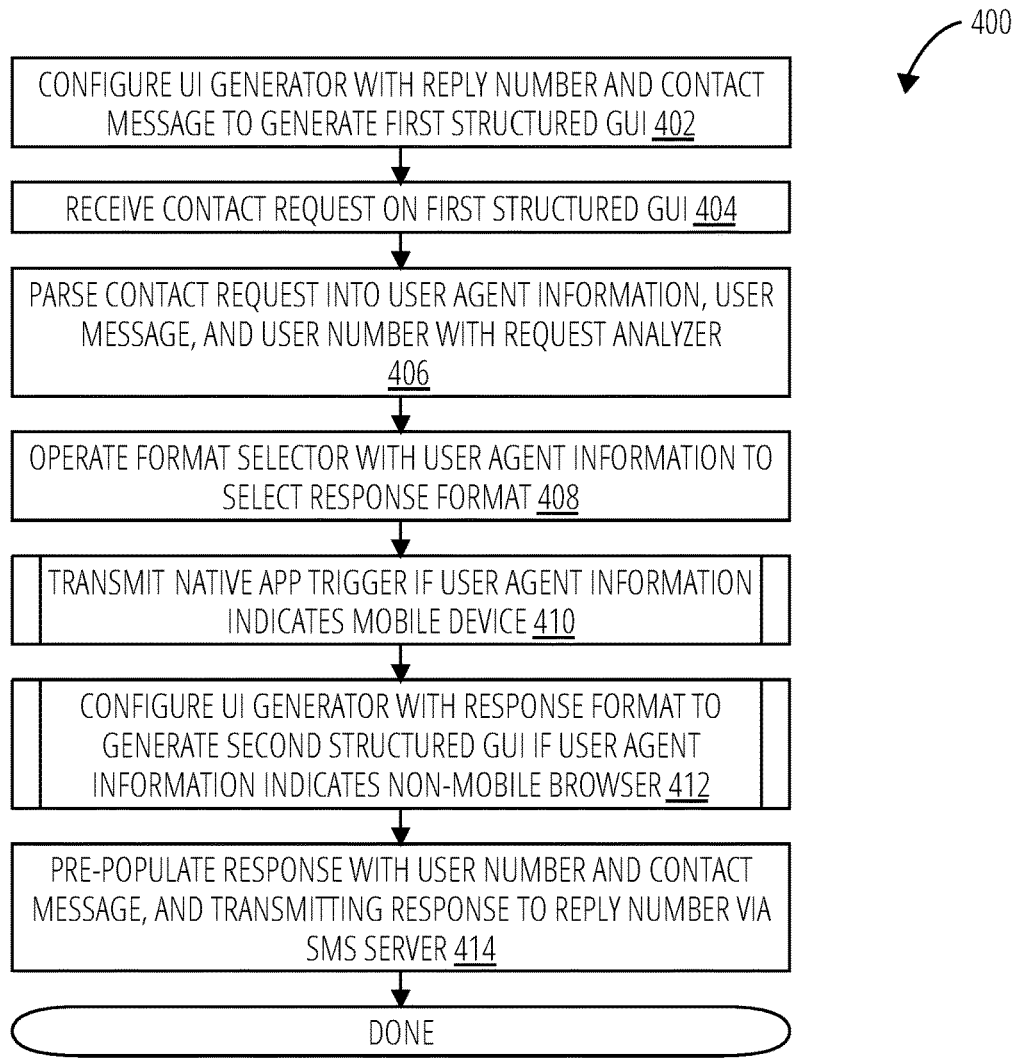
FIG. 4 illustrates an embodiment of a messaging service process 400.

Referring to FIG. 4, the messaging service process 400 configures a UI generator with a reply number and a contact message and generates a first structured GUI (block 402).

The messaging service process 400 receives contact request on the first structured GUI (block 404). The messaging service process 400 parses the contact request into user agent information, a user message, and a user number with a request analyzer (block 406).

The messaging service process 400 operates a format selector with the user agent information to select a response format (block 408). The messaging service process 400 transmits a native app trigger if the user agent information indicates a mobile device (subroutine block 410). The messaging service process 400 configures the UI generator with the response format to generate a second structured GUI if the user agent information indicates a non-mobile browser (subroutine block 412). The messaging service process 400 pre-populates a response with the user number and the contact message, and transmits the response to the reply number via a SMS server (block 414).

A method includes configuring a UI generator with a reply number and a contact message to generate a first structured GUI, then receiving a contact request on the first structured GUI. The method further includes parsing the contact request into user agent information, a user message, and a user number with a request analyzer, then operating a format selector with the user agent information to select a response format; and pre-populating a response with the user number and the contact message, and transmitting the response to the reply number via a SMS server.

The response format may include a native app trigger if the user agent information indicates a mobile device and configuring the UI generator with the response format to generate a second structured GUI if the user agent information indicates a non-mobile browser. Transmitting the response may further include transmitting the user message to the SMS server via a proxy number if the user agent information indicates a non-mobile device. The native app trigger may activate the native messaging application on the mobile device. The format selector may obtain the user agent information on each page load. The reply number may be mapped to a user account. The receipt of the response by the user account triggers the UI generator to generate a third structured GUI to display a message thread that may include the response.

Figure 5:
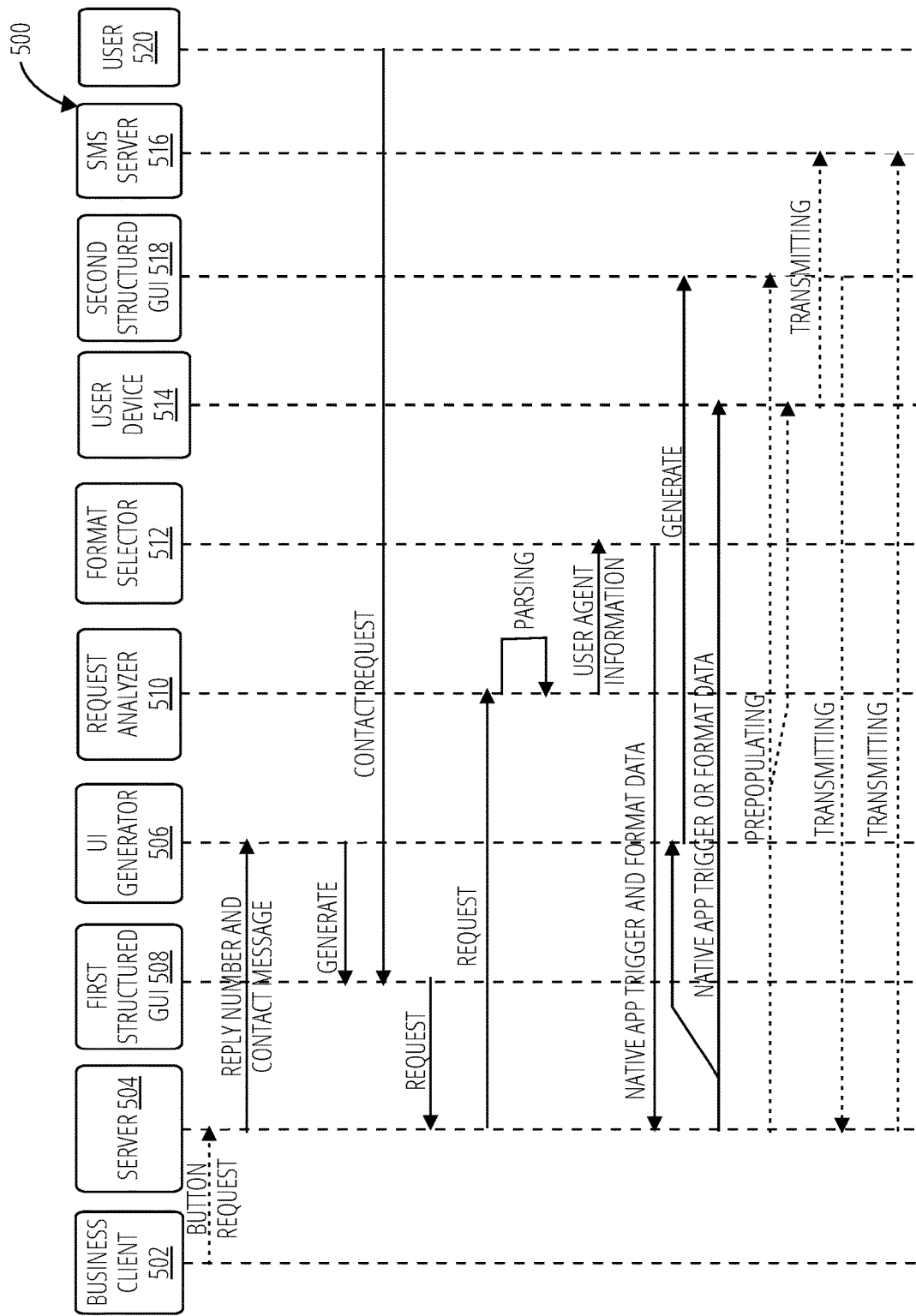
FIG. 5 illustrates an embodiment of a messaging service system 500.

FIG. 5 illustrates an embodiment of a messaging service 500. The messaging service 500 comprises a business client 502, a server 504, a UI generator 506, a first structured GUI 508, a request analyzer 510, a format selector 512, a non-mobile device 602, a SMS server 516, a second structured GUI 518, and a user 520.

The business client 502 transmits a button request to the server 504, the server 504 parses the button request into request information and client identification. The UI generator 506 generates a structured GUI on the business client 502.

The server 504 receives a request from a first structured GUI 508. The request analyzer 510 analyzes the request and operates a format selector with the user agent information to select a response format.

The format selector 512 transmits the native app trigger and format data to the server 504 to generate the second structured GUI 518 if the user agent information indicates a non-mobile device browser, or triggers a native messaging app if the user agent information indicates a mobile device. The server 504 pre-populates a response with the user number and contact message on the native messaging app on the user device 514 and the user device 514 transmits the response to the reply number via the SMS server 516.

The server 504 pre-populates a response with the user number and contact message on the second structured GUI 518 on the non-mobile device 602 and transmits the response to the reply number via the SMS server 516.

Figure 6:
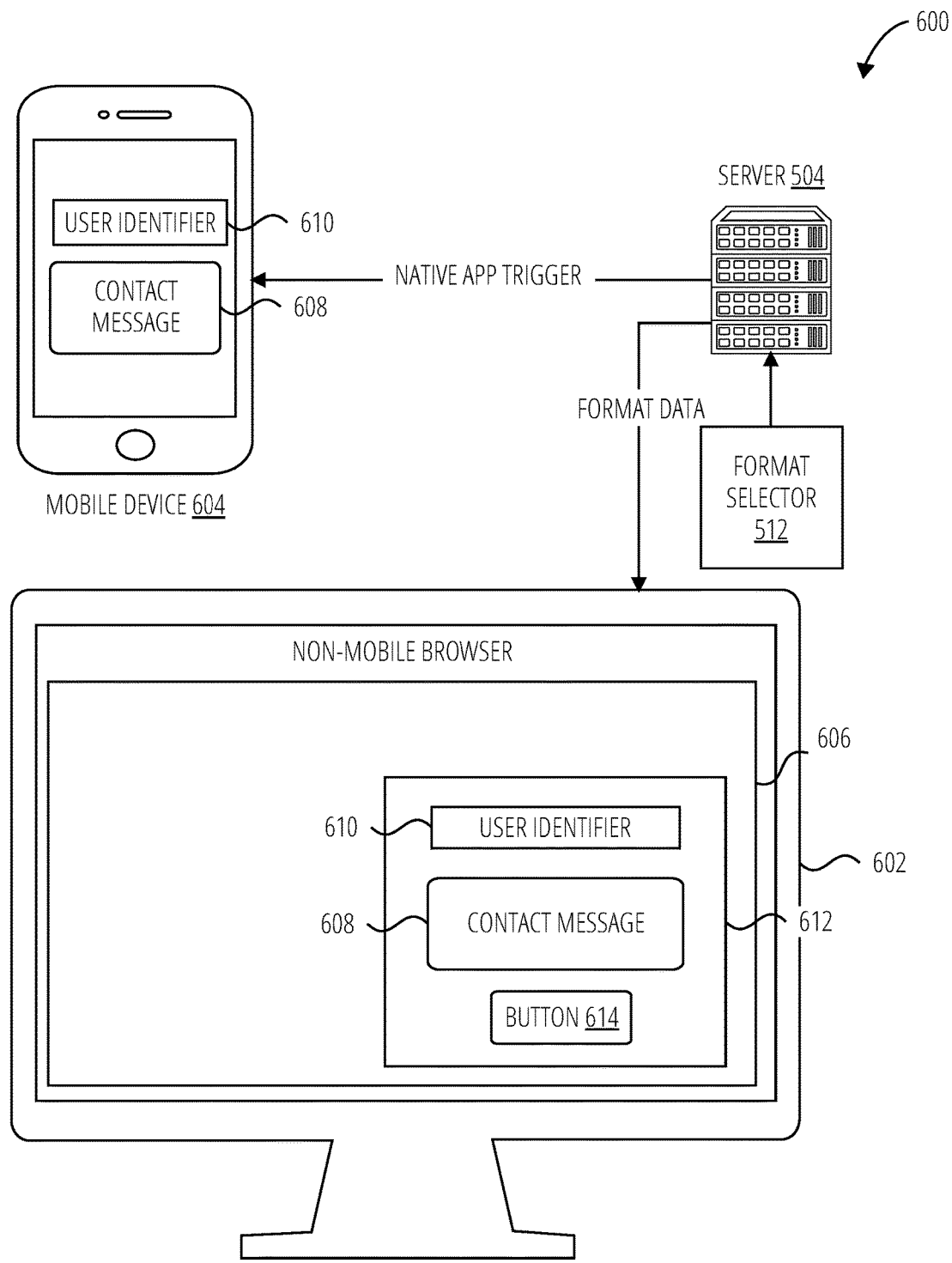
FIG. 6 illustrates an embodiment of a messaging service system 600.

FIG. 6 illustrates an embodiment of a messaging service 600. The messaging service 600 comprises a server 504, a format selector 512, a non-mobile device 602, a mobile device 604, a non-mobile browser 606, a contact message 608, a user identifier 610, a third structured GUI 612, and a button 614.

The server 504 transmits a native app trigger to the non-mobile device 602 if the user device 514 is identified as the mobile device 604. The native app trigger initiates the native messaging application on the mobile device 604 and populates a message with the user identifier 610 and the contact message 608.

The server 504 transmits format data to the non-mobile device 602 if the format selector 512 identified the user device 514 as a non-mobile device 602 via a non-mobile browser 606. The format data populates a message with the user identifier 610 and the contact message 608. The button 614 transmits a signal via the third structured GUI 612 and triggers the non-mobile browser 606 to transmit the contact message 608 to the user identifier 610.

Figure 7:
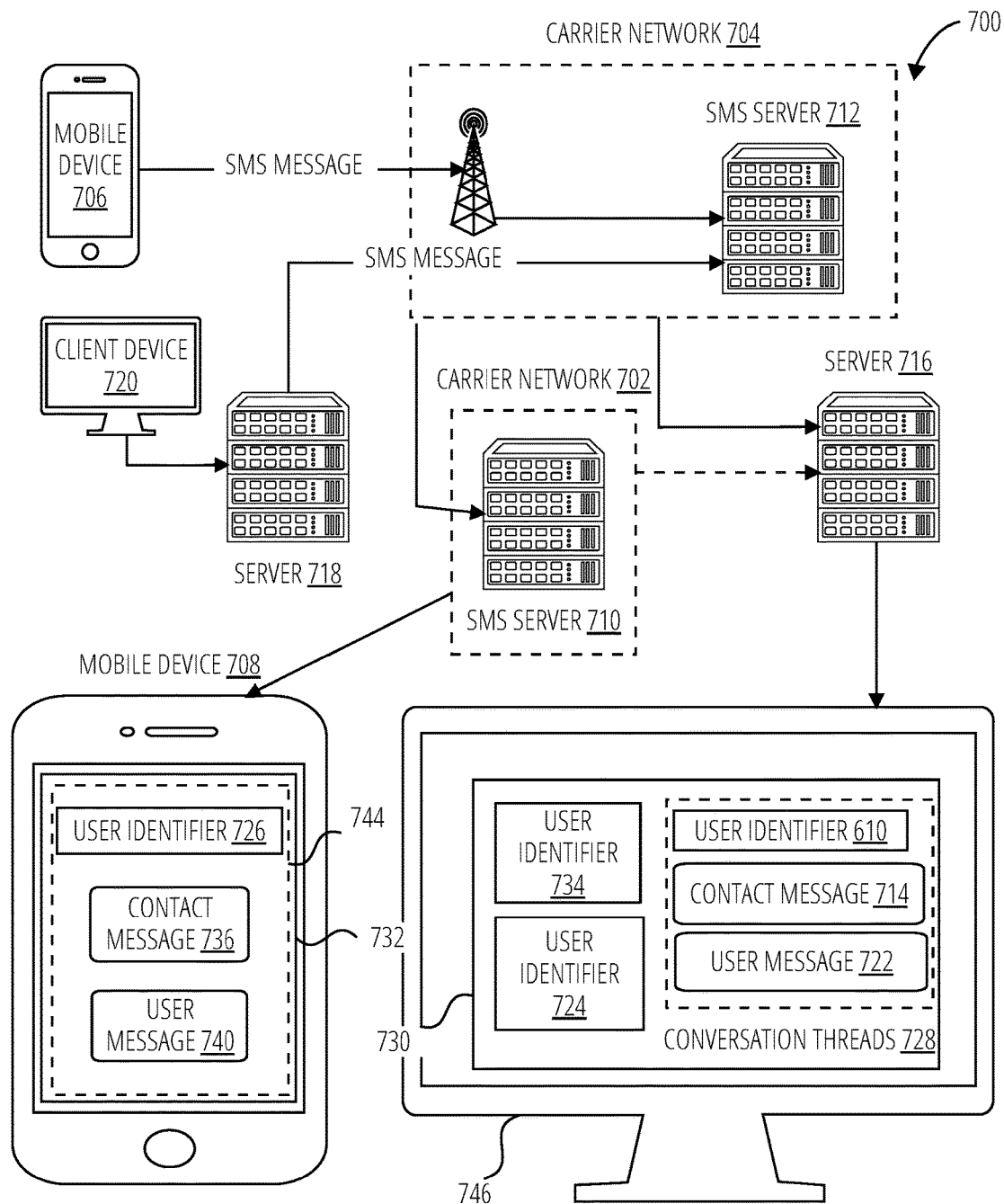
FIG. 7 illustrates an embodiment of a messaging service system 700.

FIG. 7 illustrates an embodiment of a messaging service 700. The messaging service 700 comprises a user identifier 610, a carrier network 702, a carrier network 704, a mobile device 706, a mobile device 708, a SMS server 710, a SMS server 712, a contact message 714, a server 716, a server 718, a client device 720, a user message 722, a user identifier 724, a user identifier 726, conversation threads 728, a third structured GUI 730, a third structured GUI 732, a user identifier 734, a contact message 736, a user message 740, conversation threads 744, and a non-mobile device 746.

The mobile device 706 transmits a SMS message to the SMS server 712 via the carrier network 704. The SMS server 712 transmits the SMS message to the server 716 and the server 716 transmits the SMS message to the contact message 714. The client device 720 transmits a SMS message to the server 718 and the server 718 transmits the SMS message to the SMS server 712 via the carrier network 704. The SMS server 712 transmits the SMS message to the SMS server 710 via the carrier network 702. The SMS server 710 transmits the SMS message to non-mobile device 602 via the server 716 and the non-mobile device 602 populates a third structured GUI 730 with the user identifier 734, the user identifier 724, the user identifier 610, a the contact message 714 the user message 722 and the conversation threads 728. The user identifier 610 may identify the contact message 714 and the user message 722 as belonging to conversation threads 728 associated with a particular user/customer.

The SMS server 710 may transmit the SMS message to the mobile device 708 via the carrier network 702. The mobile device 708 may populate the conversation threads 744 on the third structured GUI 732 with the user identifier 726 the contact message 736 and the user message 740. The user identifier 726 may associate the contact message 736 and the user message 740 with the conversation threads 744.

Figure 8:
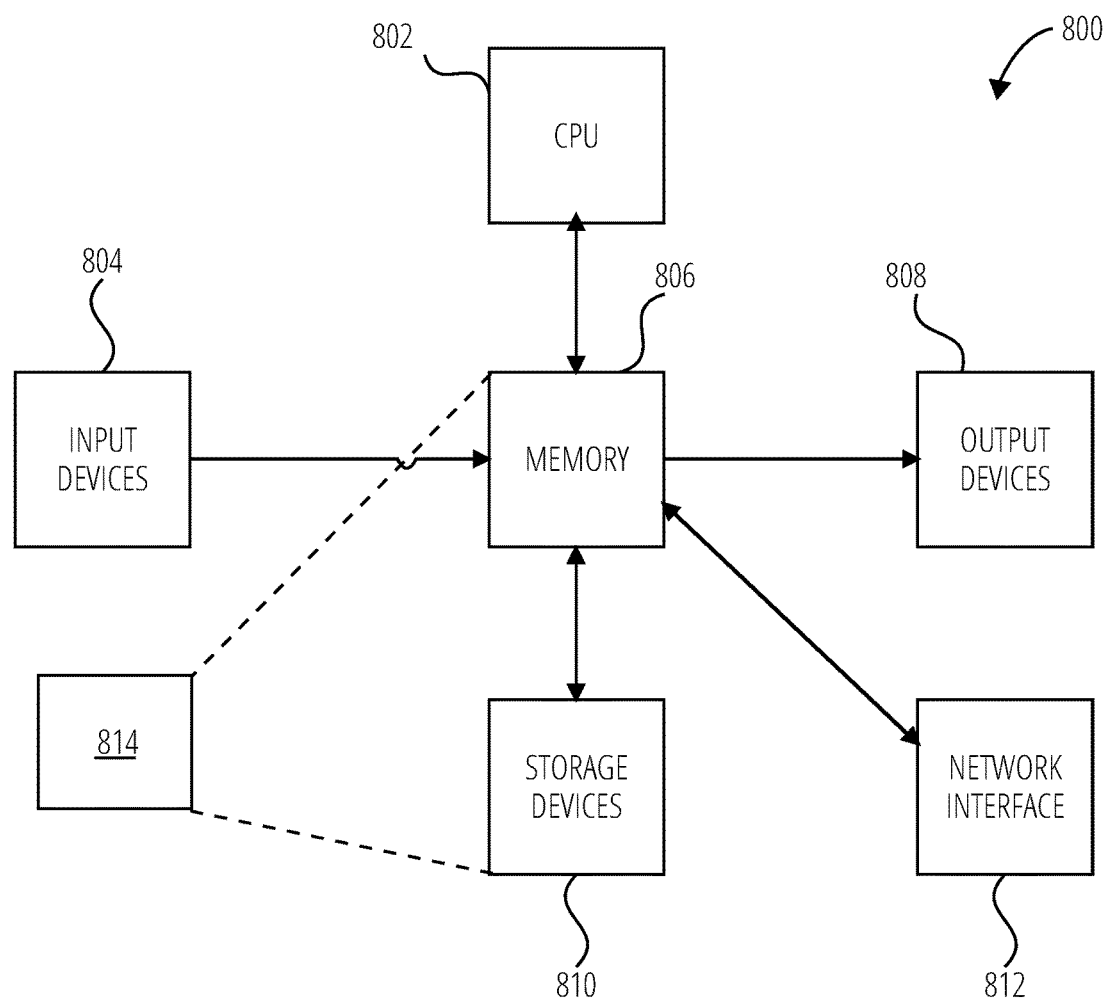
FIG. 8 illustrates an embodiment of a digital apparatus 800 to implement components and process steps of the system described herein.

FIG. 8 illustrates an embodiment of a digital apparatus 800 to implement components and process steps of the system described herein. Input devices 804 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 804 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 804 are provided via various machine signal conductors (e.g., busses or network interfaces) and circuits to memory 806.

The memory 806 is typically what is known as a first or second level memory device, providing for storage (via configuration of matter or states of matter) of signals received from the input devices 804, instructions and information for controlling operation of the CPU 802, and signals from storage devices 810.

The memory 806 and/or the storage devices 810 may store computer-executable instructions and thus forming logic 814 that when applied to and executed by the CPU 802 implement embodiments of the processes disclosed herein.

Information stored in the memory 806 is typically directly accessible to the CPU 802 of the device. Signals input to the device cause the reconfiguration of the internal material/energy state of the memory 806, creating in essence a new machine configuration, influencing the behavior of the digital apparatus 800 by affecting the behavior of the CPU 802 with control signals (instructions) and data provided in conjunction with the control signals.

Second or third level storage devices 810 may provide a slower but higher capacity machine memory capability. Examples of storage devices 810 are hard disks, optical disks, large capacity flash memories or other non-volatile memory technologies, and magnetic memories.

The CPU 802 may cause the configuration of the memory 806 to be altered by signals in storage devices 810. In other words, the CPU 802 may cause data and instructions to be read from storage devices 810 in the memory 806 from which may then influence the operations of CPU 802 as instructions and data signals, and from which it may also be provided to the output devices 808. The CPU 802 may alter the content of the memory 806 by signaling to a machine interface of memory 806 to alter the internal configuration, and then converted signals to the storage devices 810 to alter its material internal configuration. In other words, data and instructions may be backed up from memory 806, which is often volatile, to storage devices 810, which are often non-volatile.

Output devices 808 are transducers which convert signals received from the memory 806 into physical phenomenon such as vibrations in the air, or patterns of light on a machine display, or vibrations (i.e., haptic devices) or patterns of ink or other materials (i.e., printers and 3-D printers).

The network interface 812 receives signals from the memory 806 and converts them into electrical, optical, or wireless signals to other machines, typically via a machine network. The network interface 812 also receives signals from the machine network and converts them into electrical, optical, or wireless signals to the memory 806.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

What is claimed is:

1. A method comprising:
    configuring a user interface (UI) generator with a reply number and a contact message to generate a first structured graphical user interface (GUI);
    receiving a contact request on the first structured GUI;
    parsing the contact request into user agent information, a user message, and a user number with a request analyzer;
    operating a format selector with the user agent information to select a response format, the response format comprising:
        a native application (app) trigger on the condition that the user agent information indicates a mobile device; and
        configuring the UI generator with the response format to generate a second structured GUI on the condition that the user agent information indicates a non-mobile browser; and
    pre-populating a response with the user number and the contact message, and transmitting the response to the reply number via a short message service (SMS) server.

2. The method of claim 1 wherein the transmitting the response further comprises:
    transmitting the user message to the SMS server via a proxy number on the condition that the user agent information indicates a non-mobile device.

3. The method of claim 1 wherein the native app trigger activates a native messaging application on the mobile device.

4. The method of claim 1 wherein the format selector obtains the user agent information on each page load.

5. The method of claim 1 wherein the reply number is mapped to a user account.

6. The method of claim 5 wherein the receipt of the response by the user account triggers the UI generator to generate a third structured GUI to display a message thread comprising the response.

7. The method of claim 6 wherein the third structured GUI further comprises a plurality of user identifiers, and conversation threads.

8. A computing apparatus, the computing apparatus comprising:
    a processor; and a memory storing instructions that, when executed by the processor, configure the apparatus to:
   configure a user interface (UI) generator with a reply number and a contact message to generate a first structured graphical user interface (GUI);
   receive a contact request on the first structured GUI;
   parse the contact request into user agent information, a user message, and a user number with a request analyzer;
   operate a format selector with the user agent information to select a response format, the response format comprising:
      a native application (app) trigger, only if the user agent information indicates a mobile device; and
      configure the UI generator with the response format to generate a second structured GUI, only if the user agent information indicates a non-mobile browser; and
   pre-populate a response with the user number and the contact message, and transmitting the response to the reply number via a short message service (SMS) server.

9. The computing apparatus of claim 8 wherein the transmitting the response further comprises:
   transmit the user message to the SMS server via a proxy number only if the user agent information indicates a non-mobile device.

10. The computing apparatus of claim 8 wherein the native app trigger activates a native messaging application on the mobile device.

11. The computing apparatus of claim 8 wherein the format selector obtains the user agent information on each page load.

12. The computing apparatus of claim 8 wherein the reply number is mapped to a user account.

13. The computing apparatus of claim 12 wherein the receipt of the response by the user account triggers the UI generator to generate a third structured GUI to display a message thread comprising the response.

14. The computing apparatus of claim 13 wherein the third structured GUI further comprises a plurality of user identifiers, and conversation threads.

\* \* \* \* \*